United States Patent [19]

Heaston

[11] Patent Number: 4,685,023

[45] Date of Patent: Aug. 4, 1987

[54] POWER LATCH CIRCUIT FOR COMPUTER SELF DEACTIVATION

[75] Inventor: Bruce A. Heaston, West Milton, Ohio

[73] Assignee: General Motors Corporation, Detroit, Mich.

[21] Appl. No.: 930,519

[22] Filed: Nov. 14, 1986

[51] Int. Cl.$^4$ .............................................. H02H 3/24
[52] U.S. Cl. .................................... 361/88; 361/110; 361/92; 361/56
[58] Field of Search ........................ 361/54, 58, 88, 93, 361/100, 101, 110; 340/660; 307/10 R, 10 BP, 130; 365/228; 371/66

[56] References Cited

U.S. PATENT DOCUMENTS

| | | | |
|---|---|---|---|
| 4,402,294 | 7/1983 | McHugh et al. | 123/480 |
| 4,520,418 | 5/1985 | Susi | 361/88 X |
| 4,568,096 | 2/1986 | Yeu et al. | 280/6.1 |

OTHER PUBLICATIONS

Horowitz, *The Art of Electronics*, Cambridge University Press 1980, pp. 357, 358, 514, 515.

*Primary Examiner*—A. D. Pellinen
*Assistant Examiner*—Todd E. DeBoer
*Attorney, Agent, or Firm*—Robert M. Sigler

[57] ABSTRACT

A power latch circuit uses first and second bipolar transistors responsive to an actuate voltage to latch into a conductive state with power supplied to a computer and a third bipolar transistor powered by the latch circuit and responsive to a deactivate voltage from the computer to place the first and second transistors in a deactivated state to remove power from the computer and itself. It further uses an FET in parallel with the third bipolar transistor and activated directly from the DC power supply when the second transistor is deactivated to latch the first and second transistors in the deactivated state in spite of voltage fluctuations on the deactivate line which might otherwise cause the latch circuit to reactivate. As an FET, it uses little current through its gate compared to alternative bipolar devices while the latch circuit is deactivated.

1 Claim, 1 Drawing Figure

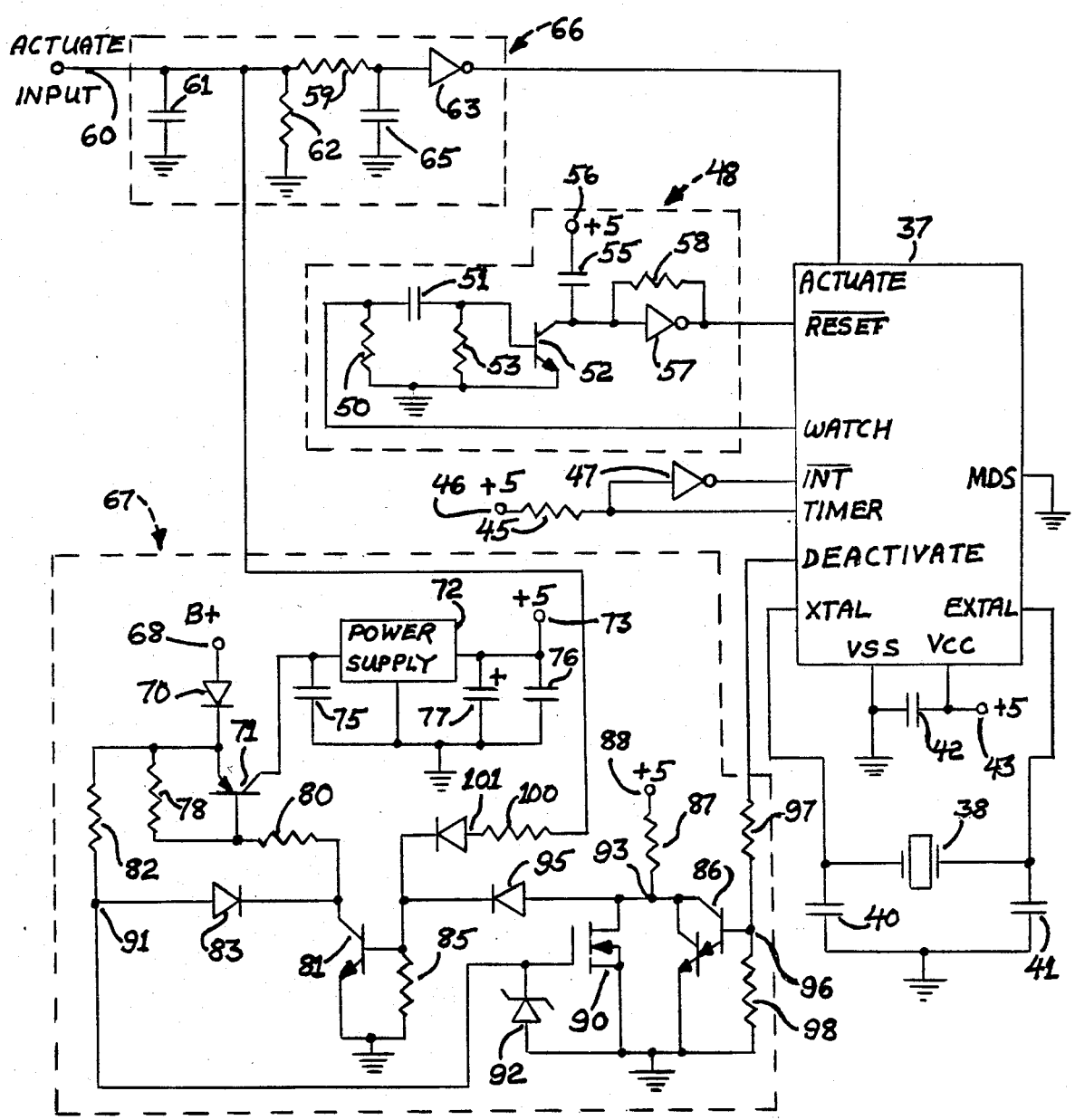

POWER LATCH CIRCUIT FOR COMPUTER SELF DEACTIVATION

BACKGROUND OF THE INVENTION

This invention relates to a power control circuit for supplying electrical power to a computer, and particularly to such a control circuit which, once activated, allows the computer itself to determine when power should be deactivated.

Such a latch circuit is sometimes subject to unpredictable signal voltage fluctuations on the deactivate signal line from the computer as the computer powers down, which fluctuations might reactivate the latch circuit and thus interfere with the proper power down operation. Therefore, the latch circuit should include means to hold it in the deactivated state once deactivation has begun. On the other hand, it is desirable to minimize current draw by the latch circuit when deactivated, particularly for motor vehicle applications. Therefore, the means preventing reactivation should have minimal current draw in its operation.

SUMMARY OF THE INVENTION

The advantages discussed above may be obtained in a power latch circuit which, briefly, uses first and second bipolar transistors responsive to an actuate voltage to latch into a conductive state with power supplied to the computer and a third bipolar transistor powered by the latch circuit and responsive to a deactivate voltage from the computer to place the first and second transistors in a deactivated state to remov power from the computer and itself. It further uses an FET in parallel with the third bipolar transistor and activated directly from the DC power supply when the second transistor is deactivated to latch the first and second transistors in the deactivated state in spite of voltage fluctuations on the deactivate line which might otherwise cause the latch circuit to reactivate. The FET draws minimal current through its gate compared to alternative bipolar devices while the latch circuit is deactivated.

Further details and advantages of this invention will be apparent from the accompanying drawings and following description of a preferred embodiment.

SUMMARY OF THE DRAWINGS

The single Figure shows a circuit diagram of a preferred embodiment of the invention.

DESCRIPTION OF THE PREFERRED EMBODIMENT

Computer 37 is a single chip microcomputer such as the Motorola (R) MC68704P2 or its equivalent, which may have terminals labeled XTAL and EXTAL connected to opposite terminals of an 8 MHz crystal 38 with capacitors 40 and 41 (30 pF) connected from the terminals to ground. Crystal 38 determines the clock rate of computer 37. Computer 37 obtains its electrical power through a VSS terminal connected to ground and a VCC terminal connected through a terminal 43 to a 5 volt DC power supply terminal of the power latch circuit, to be described, and, through a capacitor 42 (0.1 uF), to terminal VSS. An MDS terminal of computer 37 is grounded; a TIMER terminal of computer 37 is connected through a resistor 45 to a terminal 46, which is connected to the +5 volt power supply; and the TIMER terminal is also connected through an inverter 47 (74HC14) to a NOT INT terminal of computer 37.

A "watch dog" circuit 48 provides automatic reset of computer 37 in case of malfunction. Computer 37 is programmed to provide periodic output pulses on an output terminal labeled WATCH, which terminal is connected to ground through a resistor 50 (22K) and through a capacitor 51 (0.1uF) to the base of an NPN bipolar transistor 52 (2N3904) which is connected to ground through a resistor 53 (22K). Transistor 52 has a grounded emitter and a collector connected through a capacitor 55 (0.47uF) to a terminal 56, connected to the 5 volt DC power supply, and further to the input of an inverter 57 (74HC14) bypassed by a resistor 58 (330K). The output of inverter 57 is connected to the NOT RESET input of computer 37. In operation, capacitor 55, resistor 58 and inverter 57 form a free running oscillator when transistor 52 is turned off for longer than a predetermined time period. This produces repeated pulses to the RESET line of computer 37. In order to prevent this during normal computer operation, the output square wave from the WATCH output of computer 37 is applied through capacitor 51 to the base of transistor 52. Due to the combination of capacitor 51 and resistors 50 and 53, transistor 52 is turned on each positive transition of the square wave to bring capacitor 55 back to full charge before it can discharge sufficiently to allow inverter 57 to reset the computer. However, if the WATCH output of computer 37 stops in either a high or a low state for longer than the predetermined period, transistor 52 will remain turned off and thus allow the oscillator to reset computer 37 repeatedly as already described. If a reset results in correct operation of computer 37, the square wave output will once again appear to turn on transistor 52 and once again hold off the oscillator.

An actuate signal for computer 37 is received at terminal 60. This signal is at a high voltage level when actuation is desired and is otherwise at a low voltage level. Terminal 60 is labeled ACTUATE INPUT and is connected through a capacitor 61 (0.001uF) and parallel resistor 62 (10K) to ground and through a resistor 59 (100K) to the input of an inverter 63 (74HC14), which input is also connected through a capacitor 65 (0.01uF) to ground. These elements form an actuate signal conditioning circuit 66, the output of which is obtained from the output of inverter 63 and applied as the ACTUATE signal to an input terminal of computer 37 labeled ACTUATE. Notice that, because of inverter 63, the ACTUATE signal to computer 37 is at a low voltage level. Note that the actuate signal is not provided to computer 37 to actuate it, since, by itself, it is incapable of doing so. It serves as a convenient way of signalling to computer 37, which is actually actuated by the power latch circuit to be described below, that activation is still desired. When the actuation signal disappears from the ACTUATE input of computer 37, this causes a signal which may start a software controlled power down sequence which will eventually lead to the production of a deactivate signal voltage output from the DEACTIVATE terminal of computer 37 to turn off the power latch and deactivate computer 37.

Power latch circuit 67 provides the +5 volt DC supply for the devices of the circuit, including computer 37. A terminal 68, connected to a standard vehicle 12 volt B+power supply, is further connected through a forward biased diode 70 (1N4004) to the emitter of a PNP bipolar transistor 71 (ZTX551) having a collector connected to the input of a standard power supply chip 72 (LM2931AT5.0), which outputs a regulated +5 volts to a terminal 73 for application to the remainder of the circuit. The reference of chip 72 is connected to ground. The input of power supply chip 72 is further connected through a capacitor 75 (0.1 uF) to ground; and the output of power supply chip 72 is further connected through parallel capacitors 76 (0.1 uF) and 77 (470 uF electrolytic) to ground. Power supply chip 72 converts the 12 volt DC vehicle electric power to +5 volt DC power for the use of the control system; and transistor 71 controls the application of the 12 volt power to power supply chip 72.

Transistor 71 has a base connected to its emitter through a resistor 78 (1.5K) and through a resistor 80 (1K, 1/4W) to the collector of an NPN transistor 81 (2N3904) having a grounded emitter. The emitter of transistor 71 is further connected through a resistor 82 (10K) and diode 83 (CR5C) to the collector of transistor 81. Transistor 81 has a base connected through a resistor 85 (10K) to ground. An NPN Darlington transistor 86 (2N5306) has a grounded emitter and a collector connected through a resistor 87 (2.2K) to a terminal 88 connected to the +5 volt DC power supply (terminal 73, connection not shown). An FET 90 (2N7000) is connected in parallel with Darlington transistor 86 and has a gate connected to the junction 91 of resistor 82 and the anode of diode 83 and further connected through a zener diode 92 (1N4744 15V) to ground. Junction 93 of resistor 87, the collector of Darlington transistor 86 and the drain of FET 90 is connected to the anode of a diode 95 (1N4004), the cathode of which is connected to the base of transistor 81. The base of Darlington transistor 86 is connected to the junction 96 of resistors 97 (1K) and 98 (10K), which are connected in series between the output terminal of computer 37 labeled DEACTIVATE and ground. Terminal 60, labeled ACTUATE INPUT, is connected through a resistor 100 (3.3K) to the anode of a diode 101 (1N4004), the cathode of which is connected to the base of transistor 81.

In the operation of power latch 67, a high voltage signal on terminal 60, labeled ACTUATE INPUT, is communicated to the base of transistor 81 to turn it on and thus bias transistor 71 into conduction. This activates power supply chip 72 to provide 5 volts DC at terminal 73, which is connected to terminals 43, 46 and 56. The voltage on terminal 73 is also provided to terminal 88 to latch transistor 81 on, so that, after terminal 60 goes low, computer 37 may control the turnoff of transistor 71.

When the program in computer 37 determines that it is time to power down, it provides a high output from terminal DEACTIVATE to the base of Darlington transistor 86. This pulls junction 93 down near ground voltage and, the actuate signal having been removed from terminal 60, turns off transistor 81. Transistor 81 thus turns off transistor 71 to remove the +5 volts DC from terminals 73 and 88. The B+(12 volts) voltage is now provided through resistor 82 to the gate of FET 90 to turn it on; and it prevents transistor 81 from being turned on by Darlington transistor 86 and resistor 87 due to an inadvertent voltage fluctuation from computer 37 as it is powering down. Once FET 90 is turned on, the power supply is essentially latched off until the next high actuate signal appears on terminal 60. Thus an external signal may initiate operation of the control system, but, after that signal is removed, computer 37 controls when the system is deactivated. For minimal power consumption when the system is deactivated, the power is cut off completely from most circuit elements; and FET 90, which has negligible current leakage from its gate, is used in parallel with Darlington transistor 86 to hold the power latch in its deactivated state.

The embodiments of the invention in which an exclusive property or privilege is claimed are defined as follows:

1. A power latch circuit for a computer comprising, in combination:

a DC power source having first and second terminals;

a first bipolar transistor having an emitter connected to the first terminal of the DC power source, a base, a collector and a first resistor connected between the base and emitter;

voltage conditioning means connecting the collector of the first transistor to the power supply terminal of the computer;

a second bipolar transistor having a collector connected through a second resistor to the base of the first bipolar transistor, an emitter connected to the second terminal of the DC power source and a base;

a third resistor and first diode connected in series between the first terminal of the DC power source and collector of the second bipolar transistor to allow series current flow through the first diode and second bipolar transistor;

a terminal adapted to receive an actuating voltage and connected through a fourth resistor and second diode in series therewith to the base of the second transistor so as to place the second and thus the first transistors in a conductive state with the actuating voltage applied to the terminal;

a fifth resistor and third diode connected in series between the power supply terminal of the computer and the base of the second transistor in a feedback latch arrangement;

a third bipolar transistor having a collector connected to the junction of the fifth resistor and third diode, an emitter connected to the second terminal of the DC power supply and a base adapted to receive a deactivating voltage from an output of the computer, the third bipolar transistor being effective in response to the deactivating voltage to assume a conductive state and thus, in the absence of an actuating voltage, to place the first and second transistors in a non-conducting state; and an FET having source and drain connected in parallel with the emitter-collector conduction path of the third bipolar transistor and a gate connected through the third resistor to the first terminal of the DC power source, the FET thus being placed in a conductive state by the DC power source when the second transistor is placed in a non-conducting state, whereby the FET holds the second and thus the first bipolar transistors off in spite of possible loss of the deactivating voltage as the computer powers down and further minimizes current drain in the deactivated condition.

* * * * *